United States Patent [19]
Lewis

[11] 3,945,850

[45] Mar. 23, 1976

[54] PLASTIC CASED PRIMARY CELL SHEATHED IN A SPLIT METAL CASE

[75] Inventor: Richard Walter Lewis, Ponteland, England

[73] Assignee: Timex Corporation, Waterbury, Conn.

[22] Filed: Apr. 24, 1975

[21] Appl. No.: 571,141

[52] U.S. Cl. ................. 136/107; 136/133; 136/166
[51] Int. Cl.² ......................................... H01M 2/02
[58] Field of Search ............ 136/107, 111, 133, 166

[56] References Cited
UNITED STATES PATENTS

| | | | |
|---|---|---|---|
| 2,526,101 | 10/1959 | West et al. | 136/107 |
| 2,966,538 | 12/1960 | Bernot | 136/111 |
| 3,740,270 | 6/1973 | Bilhorn | 136/111 |
| 3,871,921 | 3/1975 | Betty et al. | 136/111 |

*Primary Examiner*—Donald L. Walton

[57] ABSTRACT

A plastic cased alkaline cell which may be of indeterminate or noncircular or circular shape, includes opposed plastic casing members sheathed in a split metal case, anode and depolarizing cathode materials in the respective casings with suitable separators and electrolyte, metallic spacers electrically connecting the respective anode and cathode materials with the conductive terminal portions, and an insulating seal of nonconductive plastic forming part of a peripheral flange junction between the two casing members.

3 Claims, 2 Drawing Figures

PLASTIC CASED PRIMARY CELL SHEATHED IN A SPLIT METAL CASE

BACKGROUND OF THE INVENTION

This invention relates generally to energy cells or batteries of small size adaptable for specialized shapes suitable for electric or electronic watches, hearing aids and the like. More particularly, this invention relates to a plastic cased cell that is sheathed in a split metal case.

Small primary energy cells used, for example, in watches and hearing aids are well known. These are generally of a circular configuration and known as "button" cells because of their shape. Such cells are generally of the alkaline type and employ metallic cases which, because of the circular shape, can be crimped or swaged around insulating intermediate members to hold the casing halves together. Examples of such cells are illustrated in U.S. Pat. No. 2,859,266 issued Nov. 1958 to Garbe and U.S. Pat. No. 3,708,343 issued Jan. 1973 to Walsh. These prior art energy cells are basically unsound because the methods of closing the cell by swaging imposes a great strain upon the separators and barriers particularly underneath the grommet. The consequence of which is that physical rupture of the cell is possible. Also, this method of closure can apply a sustained pressure on the separators so that finely divided cathode material could possibly be forced through them causing internal discharge of the cell. Further, the cell is susceptible to damage at the swage area giving rise to undesirable metallic particles hanging loosely on the cell. And, the internal grommet typically used in these type cells takes up a lot of space and screens the cathode area thereby reducing the efficiency of the cell.

It is also known to construct energy cells of plastic material and to seal plastic casing members around a peripheral flange, as shown in U.S. Pat. No. 2,966,538 issued Dec. 1962 to Bernot. Plastic cased cells are also known and described in U.S. Pat. No. 3,384,514 issued in May 1968 to Strobel.

Due to size, and shape of the internal components in devices such as hearing aids, electric watches and the like, it is sometimes desirable to have the energy cell powering the device in some other shape than the conventional circular cross section. When nonconventional shapes are employed, it becomes difficult to provide proper sealing between metallic casing members by crimping or swaging. An illustration of nonconventionally shaped nonmetallic energy cells are shown in assignees co-pending U.S. Pat. application Ser. No. 544,102 filed Jan. 27, 1975 on an invention made by R. Lewis and R. Sands.

When flanged plastic casing members are employed, difficulty may arise in providing sufficient and reliant electrical connection between a terminal of an energy cell that is readily replaceable and the casing of such devices which frequently are of metal such as the case of an electric watch. Further difficulties may also arise when the flanged energy cell is inserted into the watch, for example, by the flange getting caught on the case opening of the watch or on its movement or on its circuitry thereby possibly causing damage to the watch or to the energy cell.

Accordingly, an object of the present invention is to provide an improved energy cell casing whereby the deficiencies of the prior art energy cells are eliminated.

A further object of the present invention is to provide an improved energy cell casing wherein the electrolyte leakage path at the anode and cathode is eliminated.

A still further object of the present invention is to provide an energy cell sheathed in metal that can be molded in conventional or nonconventional shapes and provides for improved case sealing to prevent electrolyte leakage.

Another object of the present invention is to provide an improved construction for a plastic cased energy cell which can be molded in conventional or nonconventional shapes, provides an insulating seal between the casing members, is readily replaceable and provides reliable electrical connection between a terminal of the energy cell and the casing of an electric or electronic watch.

The accompanying drawings diagrammatically illustrate the embodiments of the present invention by way of example. Like numerals refer to like parts throughout.

DRAWINGS

FIG. 1 is a horizontal cross section of a preferred form of the energy cell, and FIG. 2 is a plane view of an energy cell especially suited for electric watches and is illustrative, without limitation, of shapes which are adaptable to the present invention.

DESCRIPTION OF THE PREFERRED EMBODIMENT

Figure 1:
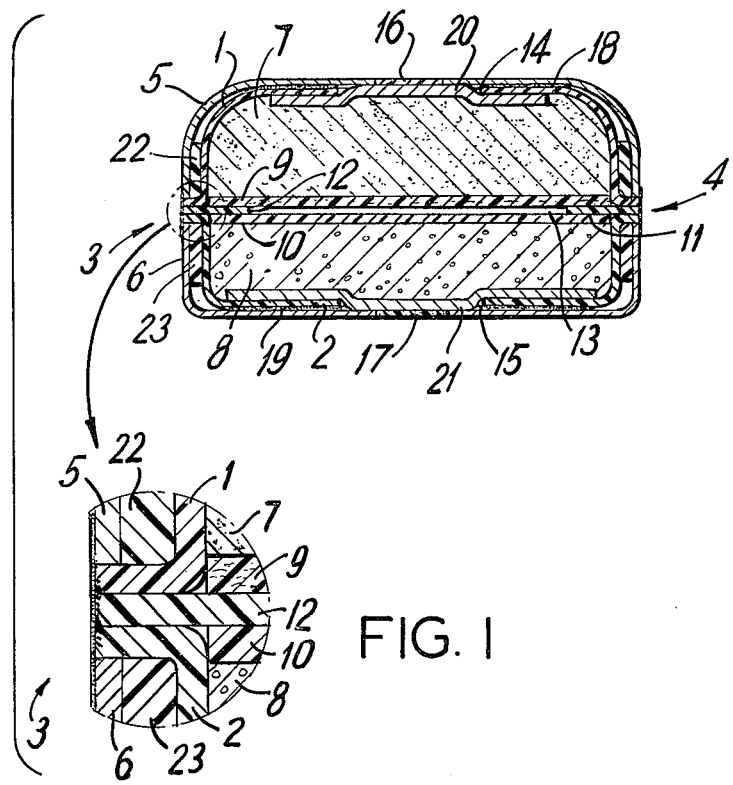

Referring to FIG. 1 of the drawings, an alkaline energy cell is shown which includes a first plastic casing member 1, a second opposed plastic casing member 2 joined together at respective juxtaposed peripheral flanges 3, 4 with each plastic casing member 1, 2 being sheathed in a metal case 5, 6.

The internal active materials of the cell, which may be more or less conventional and which are not material to the present invention, are described as follows with reference to FIG. 1. Casing 1 contains an anode 7 which may be of granulated zinc, cadmium or indium. The lower casing 2 contains a depolarising cathode 8 which can be a mixture of mercuric oxide or monovalent silver oxide mixed with graphite or a mixture of monovalent or divalent silver oxide mixed with silver powder. Separating the anode and cathode materials is a cellulosic absorbent separator 9 and a barrier membrane 10 made, for example, of a cross linked high molecular weight polyethylene methacrylic acid graft which is commercially available as a polymer called permion 2291 made by R.A.I. Research Corporation.

In order to provide an insulating and electrolyte seal between the juxtaposed peripheral flange area 3, 4 a nonconductive plastic ring 12, made for example from a semi-rigid plastic, with central aperture 13 is used as an intermediate member between the flanges 3, 4 and membrane members 9 and 11.

The casing members 1, 2 are formed, for example, from an electrically nonconductive plastic such as a rigid PVC, each with a central aperture 14, 15.

A metal terminal 20, 21 made from, for example, Phos Bronze or nickel 205 is disposed in the central apertures 14, 15 providing electrical connection to its respective anode or cathode.

The plastic casing members 1, 2 are each sheathed in a metal case 5, 6 such as stainless steel. The metal cases 5, 6 are contoured to mate with, i.e. be substantially aligned with or to, the flange portions 3, 4 to provide a smooth exterior surfaced cell so that the cell does not have exposed or protruding flanges and to provide provision for contact to be made to the side of the cell. The outer metal casings 5, 6 are electrically insulated from each other by the nonconductive flange portions 3, 4 which separate the split metal casings 5, 6. An adhesive bond or seal 18, 19 is formed between the plastic and the metal cases to form a unified cell case. The metal casings 5, 6 can have a central aperture or hole into which a silver filled expoxy resin portion 16, 17 is formed so that each half cell is sealed at the terminal (hole) portion, and electrical connection is provided between a respective terminal portion and metal case.

It should be recognized, however, that the metal casings 5, 6 could alternatively be formed without such holes and the metal casings electrically coupled to the terminals by disposing a suitable electrically conductive expoxy resin over the terminals and then sealing the metal casing over the plastic casings such that its resin forms a seal and conductor between the metal and plastic casings.

A tube or grommet-like ring 22, 23 made from an absorbent material or plastic is provided between the plastic and metal cases of each half cell. The tubes 22, 23 may be bonded to the plastic and metal cases or so formed therebetween to prevent electrolyte leakage. And, it was discovered, by sealing the outer metal case to the inner plastic case and providing a tube-like ring and sealed terminal portion as described above or in similar manner, the electrolyte leakage path at both the anode and cathode are lengthened substantially such that virtually the only possible leak area is confined to the flanges 3, 4.

The assembled cell comprises the components indicated above with a suitable electrolyte such as potassium hydroxide or sodium hydroxide added, and with the peripheral flange portions 3, 4 then being fused together by pressure and heat or by a high frequency weld applied around the periphery.

The energy cell above described is particularly useful in electric devices, such as electric watches, where the case of the energy cell and the electric device, when inserted, are in electrical contact providing a ground or reference potential path. Thus, for example, if metal case 6, which is connected to the cathode of the energy cell shown in FIG. 1, is provided with mating screw threads to the watch case, reliable electrical coupling will be provided between the terminal portion 17 of the energy cell and the watch by mere insertion of the battery thereinto.

Figure 2:
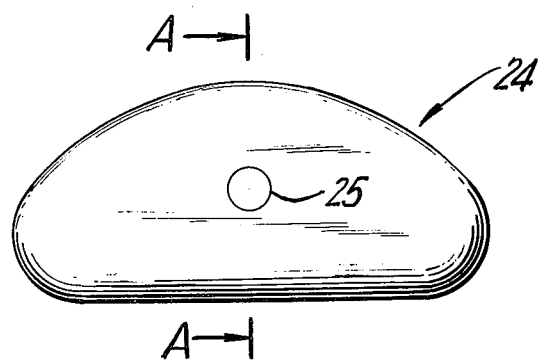

Reference to FIG. 2 shows a plane view of a noncircular cell shape suitable for an electric watch. The sheathed plastic cell casing is shown by phantom outline 24. Also, a filled conductive terminal portion 25 is shown which is similar to the terminal portions 16, 17 shown in FIG. 1 and a cross section taken along lines A—A would appear as shown in FIG. 1.

While there has been shown what is considered to be the preferred embodiment of the invention, it is desired to secure in the appended claims all modifications as fall within the true spirit and scope of the invention.

I claim:

1. An energy cell of the type having anode and depolarizing cathode material disposed in opposed plastic casing members with means separating the anode and cathode materials, a terminal portion electrically connecting with the anode or cathode material in each plastic casing member, wherein the improvement comprises:
    a peripheral flange on each of said plastic casing members, said flanges being sealed juxtaposed to one another; and
    a metal outer casing member being disposed and sealed on each of said plastic casing members with each metal outer casing member being contoured mates with said flanges to be substantially aligned therewith, said metal outer casing members each being electrically coupled to a respective terminal portion.

2. An energy cell comprising:
    a first plastic cell casing having a central aperture and a peripheral flange portion;
    a first metal cell casing having a central aperture and being contoured to form an outer sheathing on said first plastic cell casing with substantial alignment to the flange portion, said first metal cell casing being bonded to said first plastic cell casing;
    a second plastic cell casing having a central aperture and a peripheral flange portion, said second plastic cell casing being sealed to said first plastic cell casing around the flanges;
    a second metal cell casing having a central aperture and being contoured to form an outer sheathing on said second plastic cell casing with substantial alignment to the flange portion, said second metal cell casing being bonded to said second plastic cell casing;
    an anode material disposed in said first plastic cell casing;
    a first terminal portion disposed in the central apertures of the first plastic and metal cell casings;
    a first metallic spacer disposed in said first plastic cell casing between the anode material and the first plastic cell casing and electrically connected to said first terminal portion;
    a depolarizing cathode material disposed in said second plastic cell casing;
    a second terminal portion disposed in the central apertures of the second plastic and metal cell casings;
    a second metallic spacer disposed in said second plastic cell casing between the cathode material and the second plastic cell casing and electrically connected to said second terminal portion; and
    means separating said anode and said cathode materials on a plane substantially along said peripheral flanges.

3. An energy cell as in claim 2 wherein:
    the first terminal portion and the second terminal portion being electrically connected to the first and second metal cell casings respectively form metal cell case terminals insulated from each other by said flanges.

* * * * *